Figure 1:
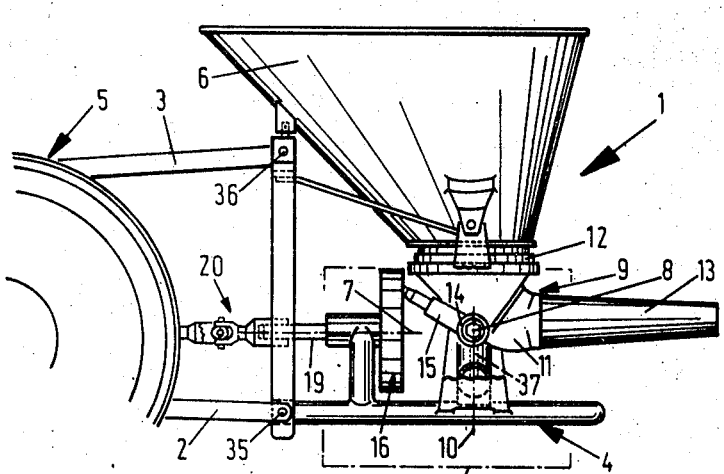

United States Patent [19]
de Koning et al.

[11] 3,837,407
[45] Sept. 24, 1974

[54] OSCILLATING AGRICULTURAL IMPLEMENT

[75] Inventors: Cornelis Jan de Koning; Pieter Adriaan Oosterling, both of Nieuw-Vennep, Netherlands

[73] Assignee: H. Vissers N.V., Nieuw-Vennep, Netherlands

[22] Filed: Feb. 4, 1972

[21] Appl. No.: 223,644

[52] U.S. Cl............... 172/40, 172/102, 74/23, 239/659
[51] Int. Cl........................... A01b 35/00
[58] Field of Search ........... 172/110, 53, 40, 84, 94, 172/93, 101, 102; 74/23; 239/659

[56] References Cited
UNITED STATES PATENTS
3,706,346  12/1972  Vissers........................... 172/678 X
FOREIGN PATENTS OR APPLICATIONS
465,944  1/1969  Switzerland......................... 172/40

*Primary Examiner*—Stephen C. Pellegrino
*Attorney, Agent, or Firm*—John P. Snyder

[57] ABSTRACT

Improvement of an agricultural implement, e.g., fertilizer spreader or harrow, at least comprising a frame to be attached to a vehicle, e.g., agricultural tractor, at least one tool, e.g., spreading nozzle or harrow beam, carried by the frame and oscillatingly moving with respect to the frame, and a driving element rotating about an axis of rotation and driving the tool via a fork, wherein a stalk of the fork is beared rotatably in the driving element outside the axis of rotation and wherein teeth of the fork are beared hingeably about a hinge axis to the tool. For facilitating, assembling and dismantling of the fork in the driving element the fork is beared in a bearing bush removably attached to the driving element and the driving element comprises a recess for letting through the stalk of the fork with removed bearing bush, said fork hinging about the hinge axis.

8 Claims, 7 Drawing Figures

OSCILLATING AGRICULTURAL IMPLEMENT

The invention relates to an agricultural implement, e.g., fertilizer spreader or harrow, at least comprising a frame to be attached to a vehicle, e.g., agricultural tractor, at least one tool, e.g., spreading nozzle or harrow beam, carried by the frame and oscillatingly moving with respect to the frame, and a driving element rotating about an axis of ratotion and driving the tool via a fork, wherein a stalk of the fork is beared rotatably in the driving element outside the axis of rotation and wherein teeth of the fork are beared hingeably about a hinge axis to the tool.

Such an agricultural implement is known as spreader and as harrow.

The invention provides an agricultural implement which is improved with respect to the mounting assembling and dismantling of the fork in the driving element in that the fork is beared in a bearing bush removably attached to the driving element and the driving element comprises a recess for letting through the stalk of the fork with removed bearing bush, said fork hinging about the hinge axis. In this agricultural emplement the fork can be easily assembled and dismantled, while the tool and the driving element remain at their place. The recess is preferably shut off by a cover in order to realize yet a continuous rotation surface of the driving element in spite of the recess.

The further developed agricultural implement according to the invention comprises a bearing bush having two ears extending in tangential direction and attached to the driving element.

The invention will be elucidated in the following description with reference to embodiments shown in a drawing.

Figure 2:
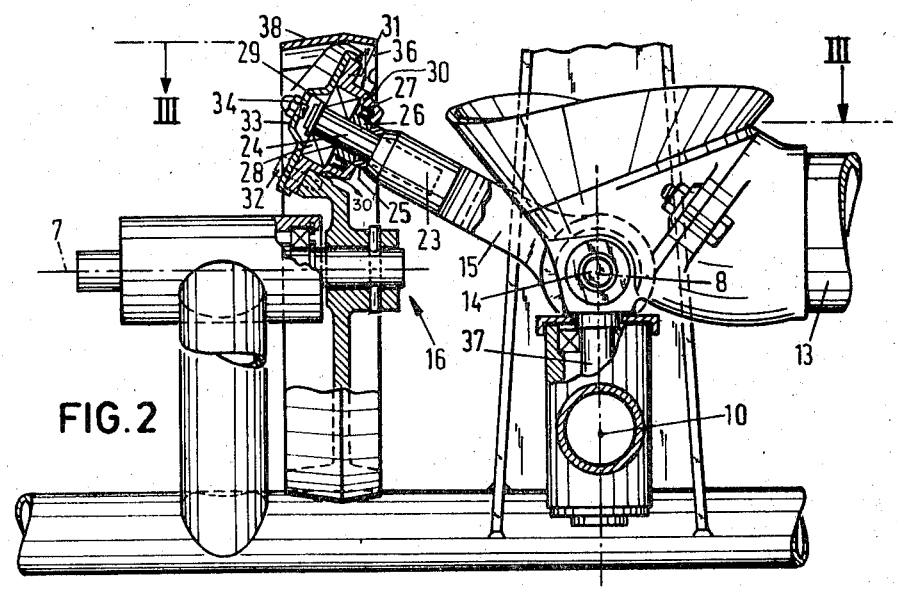
Figure 3:
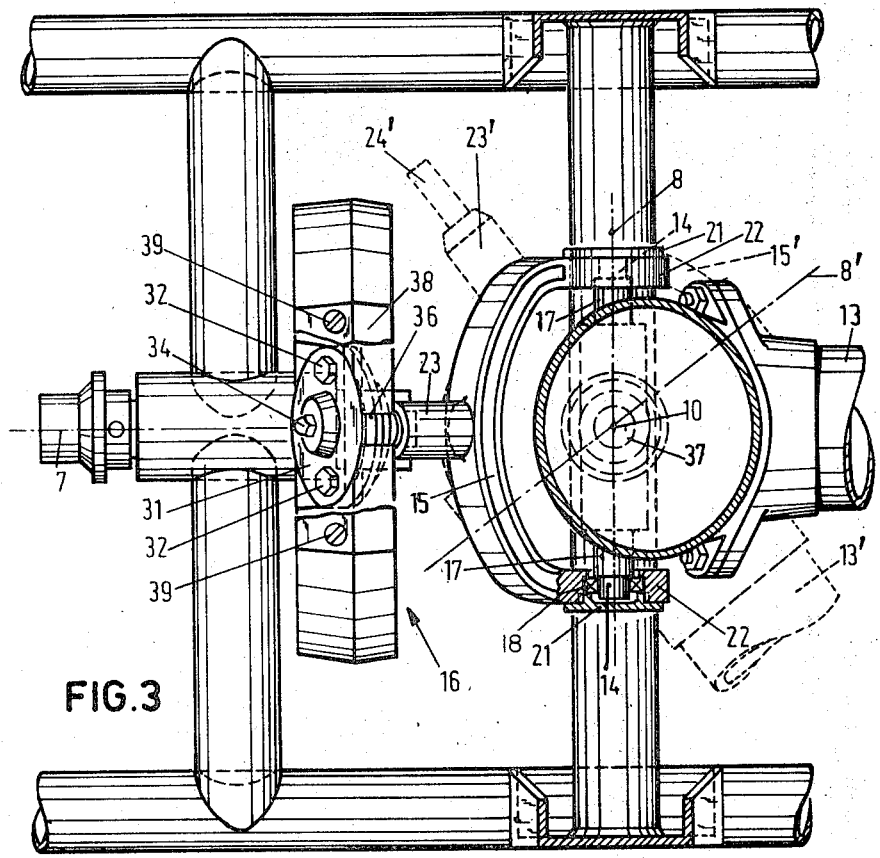
Figure 4:
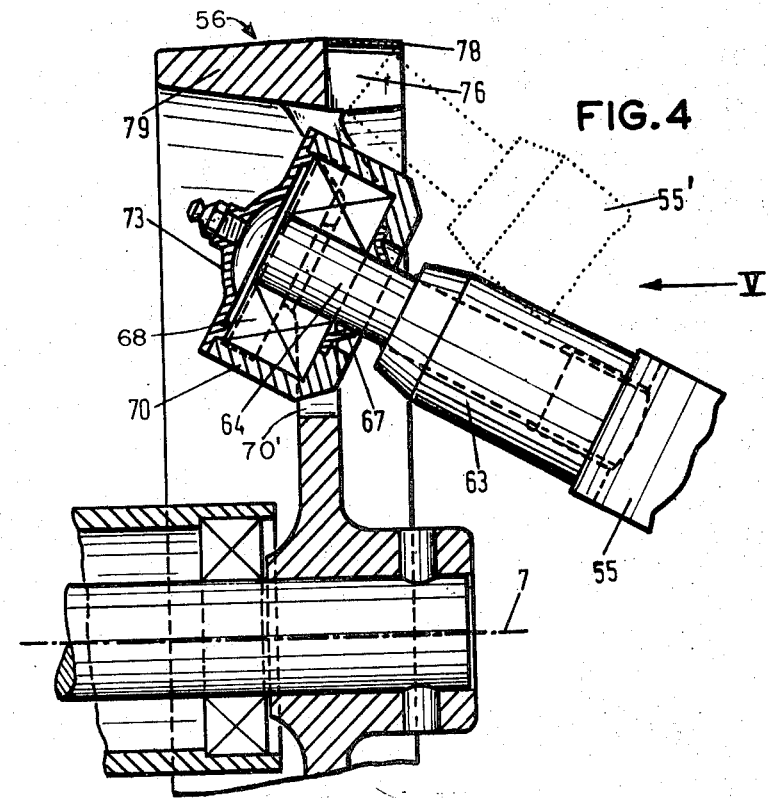
Figure 5:
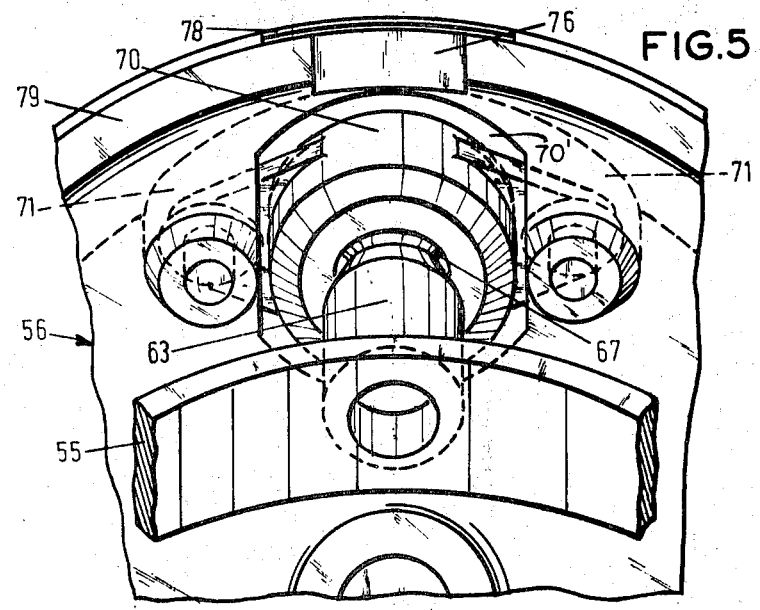
Figure 6:
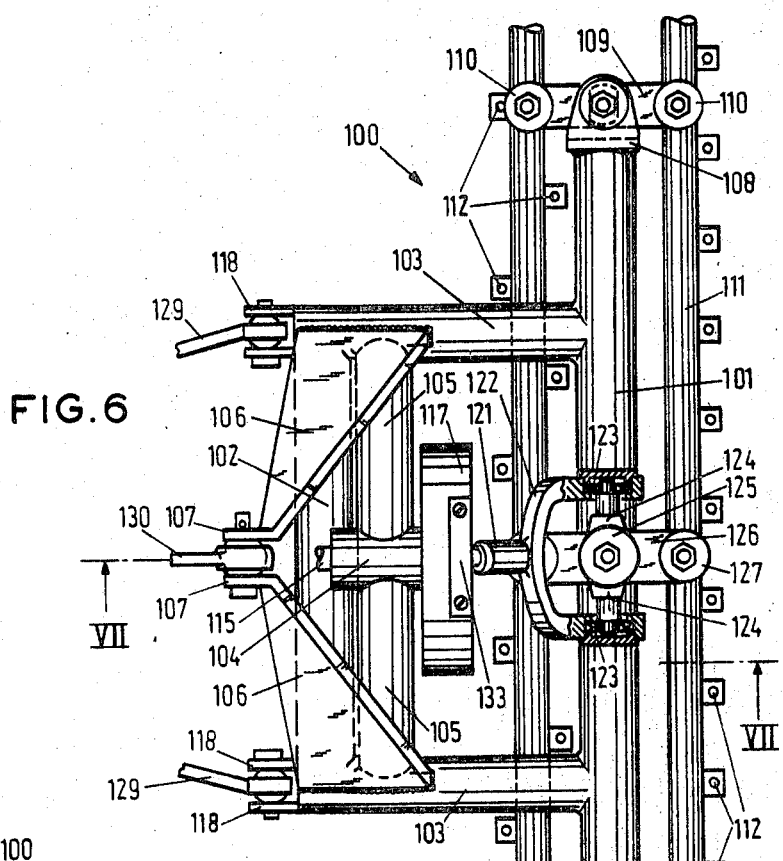
Figure 7:
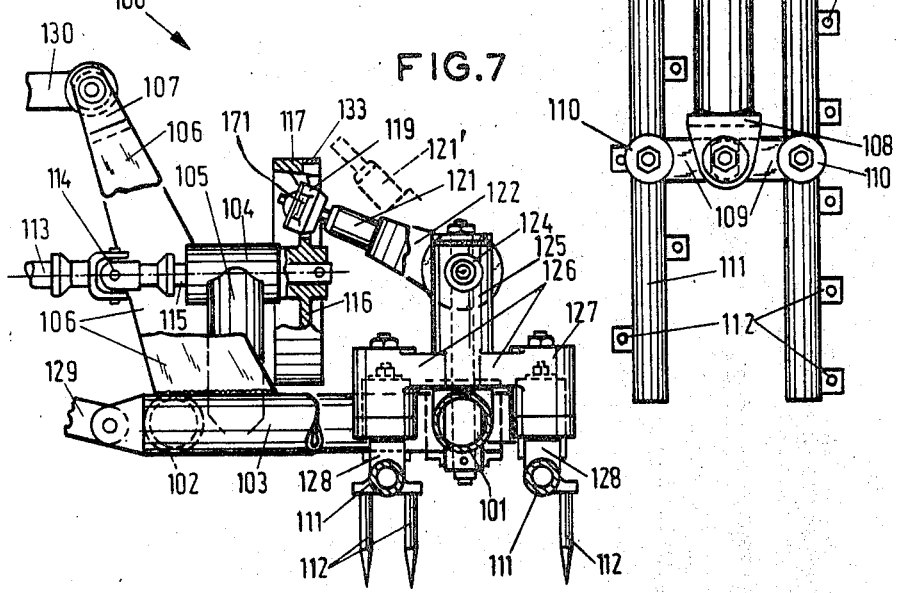

In the drawing:

FIG. 1 shows a side view partly broken away of a spreader suspended on an agricultural tractor according to the invention, FIG. 2 shows a side view partly broken away of detail II of FIG. 1, FIG. 3 shows a plan view along line III—III of FIG. 2, FIG. 4 shows a longitudinal section of a further developed detail relating to the bearing of the stalk of the fork, FIG. 5 shows a view according to arrow V of FIG. 4, FIG. 6 shows a plan view of a harrow according to the invention, and FIG. 7 shows a section along the line VII—VII of FIG. 6.

The spreader 1 of FIG. 1 comprises a frame 4 suspended on an agricultural tractor 5 by means of suspension rods 2 and top rod 3 and a storage hopper 6 for receiving spreading material to be spreaded, e.g., fertilizer. The storage hopper 6 is rigidly attached to the frame 4. Below the storage hopper 6 a spreading mechanism 9 having a journal 37 is beared swingably about a vertical axis 10 in the frame 4. The spreading mechanism 9 comprises a bowl 11 communicating via a dosage mechanism 12 with the storage hopper 6, a spreading nozzle 13 communicating with said bowl 11 and a fork 15 engaging the bowl 11 while hinging about horizontal pins 14 and thus about hinge axis 8, the stalk of said fork 15 being swingably beared in a driving element 16 constituted by a fly wheel. The driving element 16 is rigidly connected with a drive shaft 19 beared in the frame 4 about an axis of rotation 7, said drive shaft 19 being driven by means of a cardan shaft 20 from the power take off of the tractor 5.

The bowl 11 has at both sides a projection 17, in which a pin 14 is mounted. A ball bearing 18 is mounted in a bush 21 round each pin 14, said bush 21 being screwed in a tooth 22 of the fork 15.

A pin 24 is mounted in the free end 23 of the fork 15, upon which pin 24 a rubber distance ring 25, a steel distance ring 26, a sealing ring 27 sealing a bearing bush 30 and a self-adjustable roller bearing 28 mounted in the bearing bush 30 are provided and are locked up by means of a safety ring 29. The bearing bush 30 is received in an opening 30' in the flywheel and has a round flange 31 and a cover 33 which are together attached to the driving element 16 by means of bolts 32. The cover 33 mounts a greasing nipple 34. The driving element 16 constituted by a fly wheel has a recess 36 radially outside the pin 24 which recess is narrower than the opening 30' and leads radially outwardly therefrom. In order to keep yet smoothly the outer surface of the driving element 16 in spite of the recess 36, a countersunk cover 38 having countersunk screws 39 is attached to the driving element 16 at the place of the recess 36.

The stalk 23 of the fork 15 can be swung about the hinge axes 8 and 10 from the position shown in FIG. 3 with full lines into the position 15' shown with dotted lines, when during dismantling the bearing bush 30 with bearing 28 and its cover 33 are shoved off from the pin 24 and the cover 38 is removed.

When the ball bearings 18 are removed together with the bushes 21 from the teeth 22, the fork 15 can be removed and can be possibly replaced by another fork, to which end the fork 15 is pushed with one of its teeth 22 round an extension 17 and after that the other tooth 22 of the relating pin is swung. In this way dismantling and/or mounting may take place, while the spreading mechanism 9 and the driving element 16 remain at their place.

The further development of the spreader according to the invention, of which spreader only the detail shown in FIGS. 4 and 5 differs from the spreader of FIGS. 1–3, has a driving element 56 shaped in a somewhat other way and particularly an other bearing bush 70 attached to said driving element 56 and having in tangential direction two ears 71 attached to the driving element 56 by means of bolts. Said bearing bush 70 is received within the opening 70' of the member 56 and because it does not include a circumferential flange such as the flange 31 in FIGS. 1–3, requires less place in the driving element 56 and can be mounted below the outer edge 79 of the driving element 56 without requiring a recess in the edge or rim 79 to allow axial withdrawal of the bearing assembly from the fork. Only a recess 76 to be covered by means of a countersunk cover 78 is required for letting through the pin 64 of the stalk 63 of the fork 55. A self-adjustable bearing 68 is locked up in the bearing bush 70 by means of a cover 73. The bearing bush 70 is further sealed by means of a sealing ring 67.

The frame of the harrow 100 of FIGS. 6 and 7 comprises a transverse beam 101, a transverse beam 102, two longitudinal beams 103, a horizontal bearing bush 104 extending in longitudinal direction, two inclined supports 105 connecting the bearing bush 104 with the longitudinal beams 103 and two supporting plates 106 extending inclined upwards from the longitudinal beams 103, said plates 106 being each provided with an ear 107.

Ears 108 are provided at the ends of the transverse beam 101 for swingably attaching levers 109. The ends 110 of the lever 109 are hingeably connected with harrow beams 111 having teeth 112. The harrow beams 111 are so attached to the frame while reciprocating sideways.

The drive of the harrow beams 111 reciprocating oscillatingly occurs from the coupling shaft 113 of a tractor, which is connected with a drive shaft 115 by means of a cardan coupling 114.

The drive shaft 115 is beared in the bush 104 and ends into a flange 116 to which a fly wheel 117 is attached, constituting a driving element rotating about an axis of rotation 98. A bearing bush 119 is mounted with its ears 171 in the fly wheel 117. Said bearing bush 119 is identical with the bearing bush 70 of FIGS. 4 and 5. The stalk 121 of a fork 122 is swingably beared in said bearing bush 119. The fork 122 engages by means of ball bearings 123 two coaxial transverse arms 124 of a crank 125. With a rotation of the drive shaft 115 the crank 125 makes an oscillating movement. The crank 125 has at its lower end two arms 126 staggered 90° with respect to the transverse arms 124. Bearing bushes 127 are attached at the ends of the crank arms 126 for vertical journals 128 which are mounted on the top side of the harrow beams 111. The harrow 100 is suspended to the tractor not shown by means of rods 129 and 130 of ears 118 and 107, respectively. The stalk 121 can be swung with a removed bearing bush 119 and a removed cover 133 of the fly wheel 117 into the position 121' shown with dotted lines.

What we claim is:

1. In an agricultural implement having a frame adapted to be attached to a powered vehicle provided with a power take-off shaft, the combination of:
   a drive shaft journalled on said frame and adapted to be driven from the power take-off shaft of the associated powered vehicle;
   a radially projecting member fixed to said drive shaft;
   a tool mounted on said frame and including a driven shaft mounted for oscillation on said frame; and
   drive connection means connecting said member to said driven shaft for oscillating the latter in response to rotation of said member, said drive connection means comrising a fork having a pair of arms straddling the axis of said driven shaft and a stem extending to said member, hinge means hingedly connecting said arms to said driven shaft, and bearing means detachably secured to said member in radially offset relation to said drive shaft for receiving the free end of said stem, said member having an opening receiving said bearing means which normally prevents the bearing means with the fork engaged therewith to be swung outwardly about the hinge axis of the fork and said member having a recess leading radially outwardly from said opening to allow said free end of the stem to be swung aside about the hinge axis of the fork to pass through said recess and clear said member when said bearing means is separated from said member and said stem.

2. In an agricultural implement as defined in claim 1 wherein said member is provided with a cover for said recess.

3. In an agricultural implement as defined in claim 1 wherein said bearing means includes a bearing housing provided with diametrically opposed ears seating upon said member and fastener means projecting through said ears into engagement with said member.

4. In an agricultural implement as defined in claim 1 wherein said driven shaft lies in a plane perpendicular to the axis of said drive shaft and in spaced relation to said member, the hinge axis connection between said fork and said driven shaft lying in a plane containing the axis of said driven shaft with the stem of the fork extending at an acute angle with the plane last mentioned into connection with said member.

5. In an agricultural implement having a frame adapted to be attached to a powered vehicle provided with a power take-off shaft, the combination of:
   a drive shaft journalled on said frame and adapted to be driven from the power take-off shaft of the associated powered vehicle;
   a radially projecting member fixed to said drive shaft;
   a tool mounted on said frame and including a driven shaft mounted for oscillation on said frame; and
   drive connection means connecting said member to said driven shaft for oscillating the latter in response to rotation of said member, said drive connection means comprising a fork having a pair of arms straddling the axis of said driven shaft and a stem extending to said member, hinge means hingedly connecting said arms to said driven shaft, and bearing means detachably secured to said member in radially offset relation to said drive shaft for receiving the free end of said stem, said member having a recess positioned to allow said free end of the stem to be swung aside about the hinge axis of the fork to clear said member when said bearing means is separated from said member and said stem, said member comprising a flywheel having a hub fixed to said drive shaft, web means projecting radially from said hub, and a circumferentially extending rim joined to and overhanging said web means, said bearing means being secured to said web means and said recess being in said rim.

6. In an agricultural implement as defined in claim 5 wherein the hinge axis connection between said fork and said driven shaft lies in a plane containing the axis of said drive shaft, and said bearing means seats against said web means on that side thereof opposite to said fork.

7. In an agricultural implement as defined in claim 6 wherein said rim is interrupted to define said recess to allow withdrawal of said bearing means and swinging aside of said fork.

8. In an agricultural implement as defined in claim 6 wherein said recess is provided in said rim only on the same side thereof as said fork.

* * * * *